United States Patent [19]
Throup

[11] Patent Number: 5,904,377
[45] Date of Patent: May 18, 1999

[54] PIPE FITTING

[75] Inventor: Simon Craig Throup, Keighley, United Kingdom

[73] Assignee: Glynwed Pipe System Limited, West Yorkshire, United Kingdom

[21] Appl. No.: 08/837,032

[22] Filed: Apr. 11, 1997

[30] Foreign Application Priority Data

Apr. 12, 1996 [GB] United Kingdom .................. 9607598

[51] Int. Cl.⁶ .................................................... F16L 35/00
[52] U.S. Cl. ................................ 285/39; 285/40; 285/55; 285/197; 285/205; 285/298; 285/404; 285/901; 285/906; 138/89; 29/456; 29/469
[58] Field of Search .................................... 285/205, 206, 285/207, 208, 209, 210, 197, 198, 199, 40, 39, 55, 298, 404, 901, 906; 138/89; 29/456, 469

[56] References Cited

U.S. PATENT DOCUMENTS

| | | | |
|---|---|---|---|
| 1,062,635 | 5/1913 | Clements | 285/209 X |
| 3,349,792 | 10/1967 | Larkin | 285/40 X |
| 3,477,745 | 11/1969 | Williams et al. | 285/40 |
| 5,577,776 | 11/1996 | Welch | 285/197 X |

FOREIGN PATENT DOCUMENTS

| | | | |
|---|---|---|---|
| 5272684 | 10/1993 | Japan | 285/197 |
| 538191 | 12/1976 | Russian Federation | 285/210 |
| 480021 | 8/1937 | United Kingdom . | |
| 2003568 | 3/1979 | United Kingdom . | |
| 2282653 | 4/1995 | United Kingdom . | |

Primary Examiner—Dave W. Arola
Attorney, Agent, or Firm—Kenyon & Kenyon

[57] ABSTRACT

A pipe fitting adapted to be installed in an aperture in a wall of a fluid container, comprises inner and outer co-axial sleeve members interconnected for relative axial movement and a split, helically wound, washer. The inner sleeve member has an end portion insertable through the aperture, and the outer sleeve member has an annular bearing surface adjacent to the end portion adapted to overlie a first one of two opposed surfaces of the wall around the periphery of the aperture. The split washer is retained to and extends around the end portion opposite the bearing surface, and is of larger outer diameter than the aperture but is insertable therethrough by winding so as to overlie the second of the opposed surfaces of the wall. The washer is compressible into annular engagement with the second surface of the wall by relative axial movement of the inner and outer sleeve members such that the wall around the aperture is gripped between the washer and the bearing surface, thereby sealing the connection between the fitting and the wall. The fitting may be installed in an aperture of a pipe, which may be lined.

19 Claims, 3 Drawing Sheets

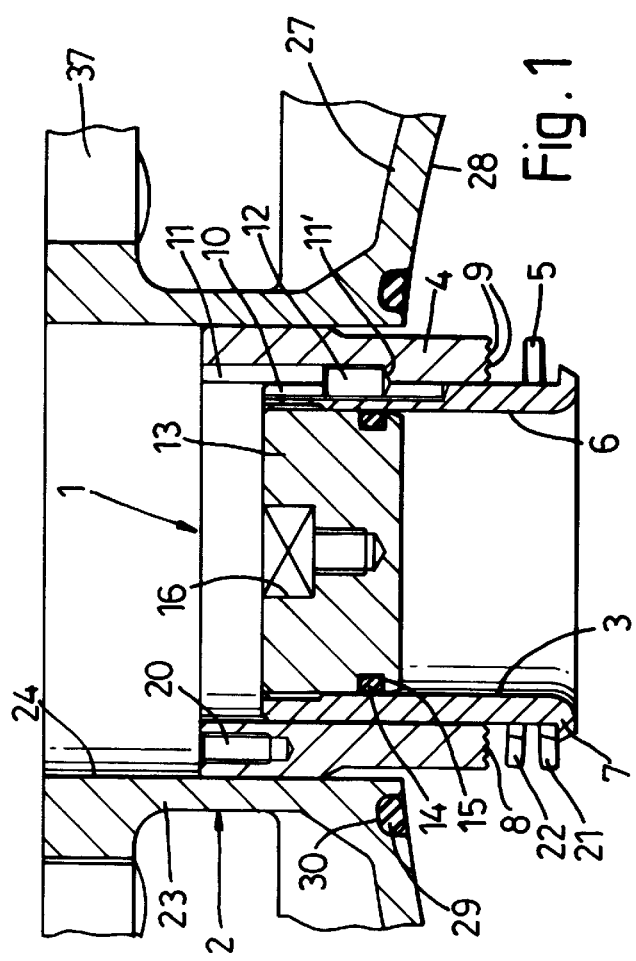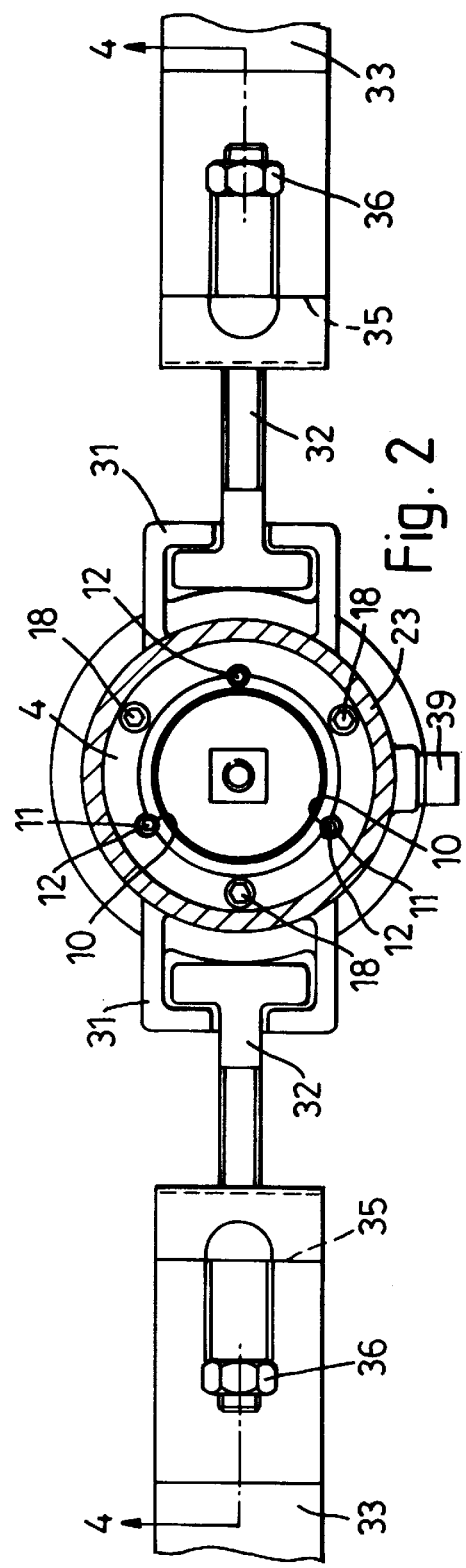

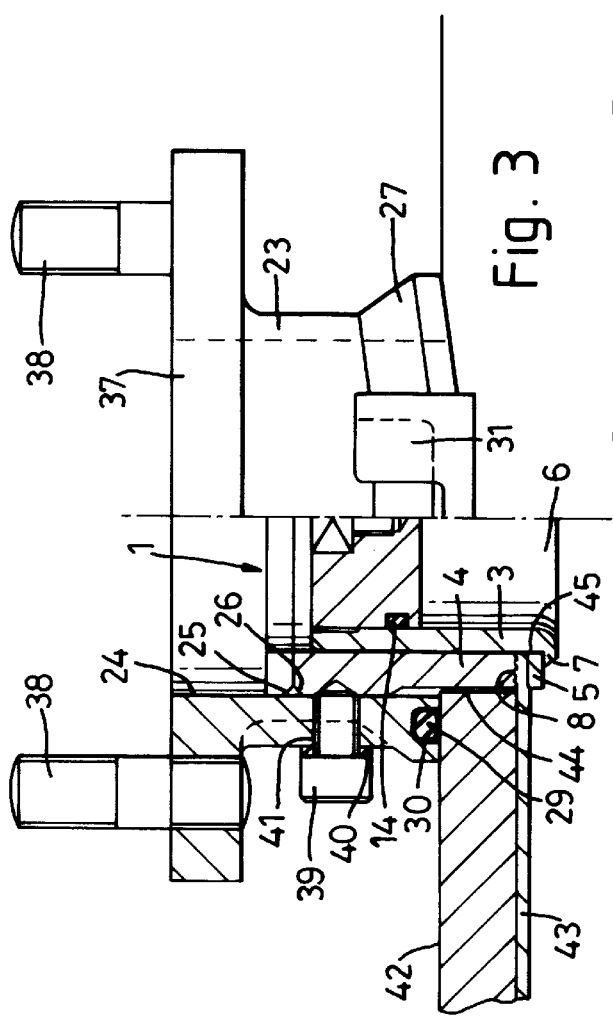

PIPE FITTING

This invention relates to a pipe fitting adapted to be installed in an aperture in a wall of a fluid container. Particularly, though not exclusively, the invention relates to a pipe fitting for use in a lined container, for example a lined pipe.

In order to remedy leakages in existing metal pipes, for example in pipes of underground main supply gas or water systems, it is common practice to apply linings to the interiors of the existing, host, pipes. This avoids the necessity for replacement of the pipes and the extensive excavation which replacement can entail. Currently the linings take one of two forms: hose lining or PE lining. A hose lining is formed from a textile sleeve which is impregnated with resin as it is drawn into the host pipe. Once installed the lining is pressurised with steam which both ensures close contact of the lining with the inside of the wall of the host pipe and cures the resin. Hose linings are comparatively thin, typically 2–4 mm, and of varying flexibility when cured. The linings, being resin impregnated textile sleeves, have roughened inner and outer surfaces. A PE lining comprises lengths of polyurethane pipe which are drawn into the host pipe. Since the PE lining is supported in the host pipe, which protects the lining from ground and pressure stresses, the polyethylene pipe used can be thinner than such a pipe would need to be as a replacement for the host pipe. In order to achieve a close fit between the host pipe and the lining the latter is swaged down, or otherwise reduced in diameter, before being drawn into the host pipe, and then when in position in the host pipe it is expanded by means of compressed air to restore it to the original diameter.

There is often a need in pipeline systems to connect a service line o a main supply pipe, or to replace a faulty fitting already in place. In both cases the fitting is inserted into a hole drilled in the main pipe's wall and it is essential that a good secure seal is provided between the fitting and the pipe wall. If the main pipe has been lined there is particular difficulty in ensuring the fitting is properly sealed to both the lining and the host pipe. Leakage between the lining and host pipe at the fitting is undesirable.

The normal method of applying a fitting to a metal main pipe for a service connection is to weld or screw the fitting to the pipe at a hole drilled in the pipe's wall. In the case of a polyethylene main pipe a fitting can be welded to the pipe wall. Neither of these methods is appropriate for lined metal pipes.

The problem of applying a fitting is complicated further by the requirement generally in public supplies for service connections to be made "live" so that flow of gas or water in the main pipe is not interrupted.

The use of sealing gaskets with fittings has been proposed. In our PCT Application PCT/GB93/00195 such a fitting is disclosed, and apparatus for and method of installing the fitting in an aperture defined by a wall of a fluid container. The fitting comprises a substantially tubular body defining an outwardly flared end portion insertable through the aperture, and a deformable collar, which forms a sealing gasket, is slidably disposed around the tubular body. The flared end portion and the collar are dimensioned so that the collar may be outwardly expanded by sliding it onto the flared end portion. In its unexpanded state the collar is insertable through the aperture and when it is expanded its maximum diameter is greater than the diameter of the aperture. The expanded collar provides a tight seal at the aperture. In the case of the aperture being in a lined pipe the expanded collar seals the fitting to the host pipe and lining.

In practice this fitting is currently made with a bore of either ¾ in. (19.05 mm) or 1in. (25.40 mm) diameter. Whilst the fitting with that bore size provides a good seal at apertures of the sizes required to be drilled into the pipe to receive the fitting, larger sizes of the fitting may not be satisfactory installed. This may be because of restrictions on the size of aperture which can be made in the wall of the pipe. For example, a hole made in the wall of a cast iron pipe cannot be greater normally than one quarter of the bore of the pipe. Also larger apertures present a problem in satisfactorily sealing the collar to the pipe because of the curvature of the pipe wall, which can give rise to some parts of the collar being over-compressed and others being under-loaded.

There is a need for a fitting of larger bore size, for example 2 in. (50.8 mm) diameter, to be installed in pipes, such as main gas pipes for service connections. The present invention aims to meet this need.

According to a first aspect of the present invention there is provided a pipe fitting adapted to be installed in an aperture in a wall of a fluid container, comprising inner and outer co-axial sleeve members interconnected for relative axial movement and a split, helically wound, washer, the inner sleeve member having an end portion insertable through the aperture, the outer sleeve member having an annular bearing surface adjacent to the end portion adapted to overlie a first one of two opposed surfaces of the wall around the periphery of the aperture, and the split washer being retained to and extending around the end portion opposite the bearing surface, being of larger outer diameter than the aperture but insertable therethrough by winding so as to overlie the second of the opposed surfaces of the wall, and being compressible into annular engagement with the second surface by relative axial movement of the inner and outer sleeve members such that the wall around the aperture is gripped between the washer and bearing surface, thereby to seal the connection between the fitting and the wall.

The fitting may be installed in an aperture in the wall of a pipe, which may or may not be lined. If the pipe is lined the split washer and bearing surface may be engaged with the inner and outer surfaces respectively of the lining around an aperture for the fitting in the lining. Sealing means may be provided to engage with the exterior surface of the pipe and seal the outer sleeve member with respect to that surface of the pipe.

For application to a lined pipe, the bearing surface of the outer sleeve member may be flat, or substantially flat. Since the lining of the pipe is flexible it can flatten into sealing contact with the bearing surface as the split washer is compressed. Similarly, compressing the split washer into a flat annular state enables the washer to make full annular sealing contact with the lining. Since this flat sealing contact is possible inside and outside the lining, the curvature of the host pipe is of no consequence and it is possible, therefore, for the aperture receiving the fitting to be relatively large with respect to the diameter of the pipe. Accordingly the fitting may be of relatively large size.

The bearing surface may be annularly ridged to increase its area of contact with the first surface of the wall.

The interior of the inner sleeve member may provide a bore through the fitting for communication with a bore of a service pipe or other attachment to be coupled to the fitting. It will be understood from the foregoing that for application of the fitting to a lined pipe the bore provided through the fitting by the inner sleeve may be of relatively large diameter with respect to the diameter of the pipe.

A plug may be removably located in the inner sleeve member. The plug may be located in the inner sleeve member for installation of the fitting in the aperture. This is desirable when, for example, the fitting is installed in a main gas or water supply pipe for a service connection to be made "live" to the main pipe. When the fitting has been connected and sealed to the main pipe the plug can be removed. The plug may be removed after a service pipe, or other attachment, has been connected to the fitting. Conveniently the plug is screw-threadedly engaged with the inner sleeve member. The plug may be adapted to have a key or other suitable turning device attached to it for rotating it relative to the inner sleeve member, and also for turning that member to wind the split washer through the aperture when installing the fitting.

Preferably the split washer extends through one complete helical turn and is arranged to be compressed into a flat state in which opposite ends are in co-planar abutting relationship, or substantially so, thereby providing essentially continuous annular contact with the second surface of the wall containing the aperture. Opposite ends of the split washer, or at least a leading end of it, are, or is, preferably radially inwardly tapered to facilitate entry of the split washer into the aperture.

One end of the split washer which is remote from the bearing surface when the washer is in its uncompressed state, is preferably fixed to the end portion of the inner sleeve member, for example by welding. The inner sleeve member is turned to wind the split washer through the aperture.

There may be screw-threaded interconnection between the inner and outer sleeve members whereby they can be moved axially relative to one another. The sleeve members may be slidably interengaged and one of them may have screw-threading with which one or more screw elements are engaged such that rotation of the or each screw element causes the sleeve members to be moved axially relative to one another, without relative rotation. The sleeve members may be slidably interengaged and one of them may have ratchet means adapted to cooperate with a ratchet element, such that, on axial movement of the sleeve members relative to one another, the ratchet means and ratchet element maintain the new positions of the sleeve members relative to one another.

A saddle may be provided in combination with the fitting adapted to be secured to the wall in which the aperture is formed to receive the fitting, and to locate the fitting for insertion into the aperture. For application to a pipe the saddle may have strap means for clamping it onto the pipe. The fitting may be detachable from the saddle. A sealed connection is preferably provided between the outer sleeve member and the saddle when the fitting is assembled with the saddle. The saddle may be adapted to have drilling means mounted on it for forming the aperture in the wall. For that arrangement the fitting is detachable from the saddle. The fitting is detached while the drilling means is mounted on the saddle and the aperture is formed. When the aperture has been formed the drilling means is detached from the saddle and the fitting is located in the saddle, which then holds the fitting in position for the split washer to be inserted through the aperture and subsequently compressed to seal the connection at the wall. The saddle may be left in place on the wall when the fitting has been installed in the aperture. It may be adapted to have secured to it a service pipe or other attachment which is connected to the installed fitting.

Reference has been made to application of the fitting to a lined pipe. In a preferred embodiment of the invention in which the fitting is provided in combination with a saddle, the saddle is adapted to have drilling means mounted on it for drilling an aperture through the wall of the host pipe and a further co-axial hole through the wall of the lining. The aperture in the wall of the host pipe is made of a diameter to receive the outer sleeve member of the fitting as a close fit, and the aperture in the lining is made of a smaller diameter to receive the end portion of the inner sleeve member as a close fit. The bearing surface of the outer sleeve member seats on the lining around the aperture in the lining when the split washer has been inserted through that aperture, and when it is compressed to seal the connection. Seals may be provided between the outer sleeve member and the saddle and at the saddle for engagement with the exterior of the host pipe.

According to a second aspect of the present invention a method is provided of applying a pipe fitting in accordance with the first aspect of the invention herein defined to a lined pipe comprising a host pipe and a lining therein, the method including the steps of forming a first aperture through the wall of the host pipe of a size to receive the outer sleeve member of the fitting and a second aperture through the wall of the lining of a smaller size to receive the end portion of the inner sleeve member and being of smaller diameter than the outer diameter of the split washer, inserting the end portion into the second aperture, winding the split washer through the second aperture to overlie the inner surface of the lining around the second aperture, and causing relative axial movement between the inner and outer sleeve members to compress the split washer into annular engagement with the inner surface of the lining and urge the outer sleeve member into the first aperture for its bearing surface to bear on the outer surface of the lining around the second aperture, thereby to grip the lining between the bearing surface and split washer and seal the connection between the fitting and the lined pipe.

Embodiments of the present invention will now be described, by way of example only, with reference to the accompanying drawings, in which:

FIG. 1 is a fragmentary axial cross-section through a pipe fitting and saddle assembly;

FIG. 2 is a partly sectioned plan view of the assembly shown in FIG. 1;

FIG. 3 is a partly sectioned side view of the assembly;

FIG. 4 is a section through the assembly on line 4—4 of FIG. 2 showing the assembly applied to a lined pipe.

Figure 5:
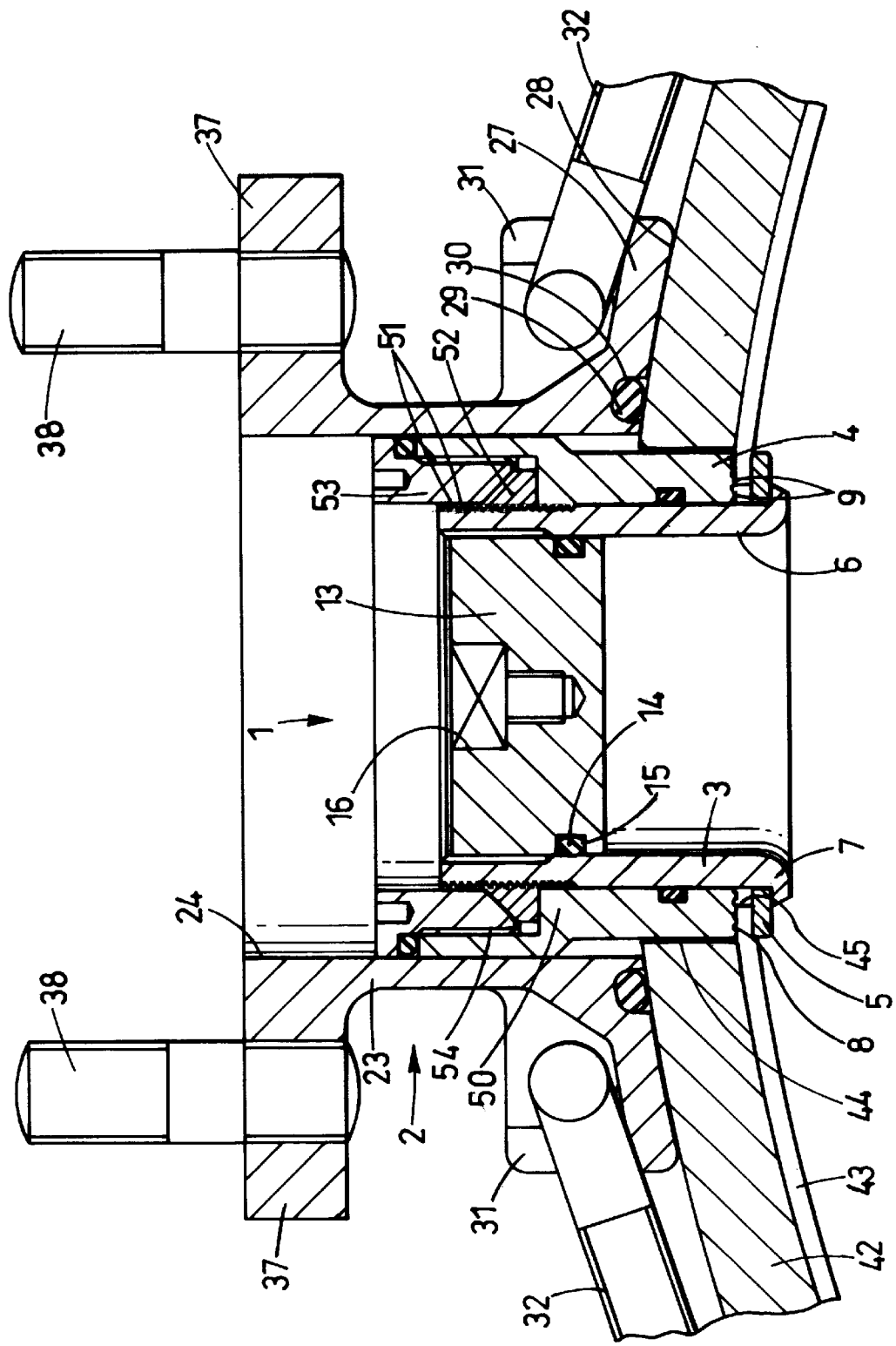
FIG. 5 is a cross sectional view through an alternative embodiment of a pipe fitting and saddle assembly, showing the assembly applied to a pipe.

In the first embodiment a pipe fitting 1 and a saddle 2 are provided as an assembly adapted for application to a lined pipe such as, for example, a cast iron main gas supply pipe (the host pipe) into which a hose lining or PE lining has been inserted. The pipe fitting enables a service pipe or other attachment to be made to the lined pipe.

The pipe fitting 1 comprises a cylindrical inner sleeve member 3 slidably engaged in a cylindrical outer sleeve member 4, and a split washer 5 carried by the inner sleeve member at an inner end portion 6 of that member.

Both sleeve members 3, 4 are made of metal, for example a suitable steel, and the split washer 5 is made of a spring metal, for example a spring steel.

The inner portion 6 has an external annular flange 7 on which the split washer 5 is supported and fixed. An inner end of the outer sleeve member 4 facing the annular flange 7 of the inner sleeve member 3 presents an annular bearing surface 8 opposite the split washer 5. In this embodiment the bearing surface 8 is formed with a series of shallow concentric annular ridges 9. It may be flat instead. The outer diameter of the bearing surface 8 is larger than the outer diameter of the annular flange 7 and corresponds substantially to the outer diameter of the split washer 5.

Registering part-circular grooves 10, 11 are formed at angularly spaced positions in the external surface of the inner sleeve member 3 and the internal surface of the outer sleeve member 4. The grooves 10 in the inner sleeve member 3 have screw thread formations with which grub screws 12 are threadedly engaged. The grooves 11 in the outer sleeve member 4 are plain. By rotation of the grub screws 12, whilst their inner ends are bearing on closed inner ends 11' of the plain grooves 11 and thereby restrained from axial movement relative to the outer sleeve member, their interengagement with the screw-threaded grooves 10 of the inner sleeve member causes relative axial movement between the sleeve members, without relative rotation of the members.

A metal plug 13 is screw-threadedly engaged in the inner sleeve member 3 at its outer end to close that end of the member. A sealing O-ring 14 located in an annular groove 15 around the plug 13 seals on the internal surface of the inner sleeve member. A central squared socket 16 is formed in the outer end of the plug to receive a key, not shown, for turning the plug to screw it into and out of the inner sleeve member.

A closure plate 17, FIG. 4, is detachably secured over the outer end of the outer sleeve member 4 by socket-headed screws 18 passed through plain holes 19 in the closure plate and tightened into angularly spaced, tapped, blind holes 20 opening though the outer end face of the outer sleeve member.

The split washer 5 extends in its free, uncompressed, state, as shown in FIG. 1, through one full helical turn so that opposite ends 21,22 of the washer at the split are axially spaced apart. The split washer can be compressed into a flat annular state in which the opposite ends 21, 22 are immediately opposite one another, in or just out of abutting contact. The two ends are radially inwardly tapered and one end 21 is fixed, as by welding, to the annular flange 7 of the inner sleeve member, the other end 22 extending towards the bearing surface 8 when the split washer is in its free state.

The saddle 2 is a metal, for example cast iron, casting comprising a cylindrical tubular body 23 having a through bore 24 in which the outer sleeve member 4 of the fitting is a sliding fit. A sealing O-ring 25 located in an annular groove 26, FIG. 3, round the outer sleeve member adjacent to the closure plate 17 seals the member in the bore 24. At an inner end of the body 23 is an annular seating flange 27 having a part cylindrically concave seating surface 28 of complementary curvature to the external diameter of the host pipe to which the fitting is designed to be applied. A sealing O-ring 29 is located in an annular groove 30 in the seating surface 28. Formed as diametrically opposed extensions from the seating flange 27 are two locations 31 for T-bolts 32 which connect to the saddle opposite ends of a metal strap 33 which extends around the host pipe for clamping the saddle to the host pipe. The T-bolts 32 pass through plain holes 34 in retaining pins 35 at the ends of the strap 33 and are fitted with nuts 36 which can be tightened against the retaining pins to retract and extend the T-bolts lengthways of the strap for adjusting the tension of the strap around the host pipe. At an outer end of the body 23 is an annular mounting flange 37 on which there are attachment studs 38, FIG. 3, at angularly spaced positions around the body. A drilling machine, not shown, can be attached to the saddle on the mounting flange 37 by means of the studs 38 and retaining nuts, not shown, tightened on the studs.

A conically pointed set screw 39, FIG. 3, fitted with a washer 40, for example of copper, is screwed into an internally threaded hole 41 through the wall of the body 23. This set screw 39 can be tightened onto the outer sleeve member 4 to hold the member secure at any required position along the bore 24 of the body.

Application of the pipe fitting and saddle assembly will now be described. With the fitting detached, the saddle is clamped by means of the strap 33, as shown in FIG. 4, onto a host pipe 42 of a lined pipe, having a lining 43, at the position along the pipe where a connection, for example of a service pipe, is to be made. The central axis of the bore 24 of the body 23 is centred on the part of the circumference of the host pipe where the connection is required.

When the saddle is in place a drilling machine is mounted on the saddle and a first aperture 44 is drilled through only the wall of the host pipe 42, of a diameter complementary to the external diameter of the inner end of the outer sleeve member 4. A smaller diameter bit is then used in the drilling machine to drill a second aperture 45, FIG. 3, through the wall of the lining 43 of complementary diameter to the external diameter of the inner end portion 6 of the inner sleeve member 3.

Having drilled the two apertures 44, 45, the drilling machine is detached from the saddle and the pipe fitting 1 is inserted into the saddle. The set screw 39 is left slackened so that the outer sleeve member is free to slide and rotate in the bore 24.

Next a key is applied to the socket 16 of the plug 13, after removal of the closure plate 17. By pushing and turning on the key the inner end portion 6 of the inner sleeve member 3 is inserted through the second aperture 45 in the lining 43 and the split washer 5 is also wound through that aperture to the inside of the lining. With one complete turn of the split washer through the second aperture it is fully inserted through the aperture to lie against the inner surface of the lining around the aperture. The outer sleeve member engages in the first aperture 44 in the wall of the host pipe 42 to guide the inner sleeve member and the split washer into the second aperture. The outer sleeve member is pushed into the first aperture until the bearing surface 8 bears on the outer surface of the lining 43 around the second aperture 45. Set screw 39 is tightened onto the outer sleeve member to hold the member securely in that position relative to the saddle and host pipe.

Turning the grub screws 12 in the direction to cause the inner sleeve member to be moved axially into the outer sleeve member then draws the split washer 5 towards the bearing surface 8, so as to bear on the inner surface of the lining. The grub screws 12 are turned until the split washer has been compressed into the fully flattened annular state, as shown in FIGS. 3 and 4, and it has been urged as tightly as possible against the lining. Thus the lining is tightly gripped, flat and evenly, between the split washer and bearing surface all around the second aperture 45, and a good sealed connection is obtained between the lining and the pipe fitting. The annular ridges 9 of the bearing surface 8 dig into the outer surface of the lining to increase the sealing contact between the two surfaces.

Sealing of the pipe fitting and saddle assembly to the host pipe 42, by means of the O-ring 29 between the seating flange 27 of the saddle and the exterior surface of the host pipe, seals the connection against entry of fluid, for example ground water, between the host pipe and lining and against escape of any fluid, for example tramp gas, trapped between the lining and host pipe.

A service pipe, or other required attachment, is connected to the assembly using the studs 38 on the mounting flange 37 to secure the joint. The closure plate 17 may be re-attached to the outer sleeve member until the service pipe or other attachment is to be connected. When the service pipe or attachment has been connected the plug 13 is finally removed from the inner sleeve member, by way of an access normally provided at the service pipe or attachment, to allow fluid flow through the fitting from the lined pipe.

The second embodiment of the invention, as shown in FIG. 5, is essentially similar to the first embodiment, and, where appropriate, like reference numerals have been used for both. The two embodiments differ in the manner in which relative axial movement between the inner and outer sleeve members 3, 4 is achieved. In the second embodiment the registering grooves in the sleeve members are dispensed with, and the inner sleeve member 3 is almost entirely of cylindrical form. The outer sleeve member 4 has an annular portion cut away from its inner surface, to form a shoulder 50. The screw thread formations on the inner sleeve member are replaced by a series of circular saw tooth grooves 51. These cooperate with corresponding grooves in a ratchet ring 52. A lower part of the ratchet ring 52 abuts in use the shoulder 50 provided on the outer sleeve member, and an upper part of the ratchet ring is tapered forming a conical, annular recess 54 between the ratchet ring and the outer sleeve member. A ratchet effect is created between the inner sleeve member and the ratchet ring 52, so that when the sleeve member is pulled upwards and released, the sleeve maintains its position. A locking ring 53 is fitted inside the outer sleeve member 4, around the inner sleeve 3, is threadedly engaged with the outer sleeve member, and is tapered at its lower end so that in use it locates in the conical recess 54 between the ratchet ring and the outer sleeve member, maintaining the ratchet ring in connection with the inner sleeve member and the shoulder 50 of the outer sleeve member.

Application of the pipe fitting 1 and saddle 2 of the second embodiment is similar to that of the first embodiment. The saddle is clamped to the pipe 42, and apertures 44, 45 drilled in the pipe and its lining 43 as before. Prior to installation of the fitting to the pipe, the locking ring 53 is removed. The pipe fitting is then inserted into the saddle and the inner end portion 6 of the inner sleeve member 3 and the split washer 5 inserted through the aperture 45 in the lining as before. To compress the split washer the inner sleeve member 3 is moved axially into the outer sleeve member 4 as follows. An installation tool (not shown) is screwed into the socket 16 of the plug 13. The installation tool is provided with a circular skirt which engages on the top of the ratchet ring 52. The inner sleeve member is moved axially relative to the outer sleeve member by means of the installation tool, and, as the inner sleeve member is pulled upwards, the circular skirt of the tool holds the ratchet ring in place against the shoulder 50 of the outer sleeve member, whilst allowing radial extension of the ring. When the inner sleeve member has been moved so that the split washer is fully compressed, as shown in FIG. 5, the installation tool is removed and the locking ring 53 is engaged with the outer sleeve member holding the ratchet ring in place against the inner sleeve member and the shoulder of the outer sleeve member.

By the use of the fitting and saddle assemblies described a pressure tight connection is made to the lining with minimal stress on the lining resulting from the installation of the fitting. The mechanical support provided by the host pipe is maintained. This is so even though the fitting may be used to connect a service pipe or attachment of relatively large internal diameter, for example 2 in. (50.8 mm), to a lined main gas or water supply pipe, because apertures of acceptable size can be formed in the host pipe and lining for installation of the fitting. The connection can be made "live". It can also be made to either a hose lining or a PE lining. The connection is made mechanically, the saddle providing restraint against effects of ground and other forces on the connection, and a minimum of special equipment and materials is required. Furthermore, the connection simulates the performance of conventional service connections; it contains the plug which is a requirement for public utility installations; it can be fitted to the top of the lined pipe and it enables a horizontal connection to be made to a service pipe.

I claim:

1. A pipe fitting for installation in an aperture in a wall of a fluid container, the pipe fitting comprising inner and outer sleeve members interconnected for axial movement relative to one another and a split, helically wound, washer, the inner sleeve member having an end portion coupled to the split washer, the end portion being insertable through the aperture, the outer sleeve member having an annular bearing surface adjacent to the end portion so that, when installed in the aperture, the annular bearing surface overlies a first one of two opposed surfaces of the wall around a periphery of the aperture, wherein the split washer extends around the end portion opposite the bearing surface, and wherein an outer diameter of the split washer is larger than a diameter of the aperture but is insertable therethrough by rotation about an axis of the split washer so as to overlie a second of the opposed surfaces of the wall, the split washer being compressible into annular engagement with the second surface by axial movement of the inner and outer sleeve members relative to one another such that the wall around the aperture is gripped between the split washer and the bearing surface so that contact between the split washer and the second surface and contact between the first surface and the bearing surface seal the connection between the fitting and the wall.

2. A pipe fitting according to claim 1, in which, when the fitting is installed in a lined pipe, the split washer and the bearing surface engage inner and outer surfaces respectively of a wall of a lining of the pipe around an aperture formed for the fitting in the lining.

3. A pipe fitting according to claim 1, in which an interior of the inner sleeve member provides a bore through the fitting for communication with a bore of an attachment to be coupled to the fitting.

4. A pipe fitting according to claim 1, in which a plug is selectively coupleable to the inner sleeve member.

5. A pipe fitting according to claim 4, wherein the plug threadedly engages the inner sleeve member.

6. A pipe fitting according to claim 4, in which the plug is selectively coupleable to a turning device for rotating the plug relative to the inner sleeve member.

7. A pipe fitting according to claim 6, in which the turning device turns the inner sleeve member to rotate the split washer about its axis to insert the split washer through the aperture when installing the fitting.

8. A pipe fitting according to claim 6, wherein the turning device is a key.

9. A pipe fitting according to claim 1, in which the split washer extends through one complete helical turn and, when installed in the aperture is compressed into a flat state in which opposite ends of the split washer are in substantially co-planar abutting relationship, thereby providing essentially continuous annular contact with the second surface of the wall.

10. A pipe fitting according to claim 9, in which the opposite ends of the split washer are radially inwardly tapered to facilitate entry of the split washer into the aperture.

11. A pipe fitting according to claim 1, in which an end of the split washer which is remote from the bearing surface when the washer is in its uncompressed state, is coupled to the end portion of the inner sleeve member.

12. A pipe fitting according to claim 1, in which there is a screw-threaded interconnection between the inner and outer sleeve members whereby they can be moved axially relative to one another.

13. A pipe fitting according to claim 1, in which the inner and outer sleeve members are slidably interengaged and one of the inner and outer sleeve members has screw threading with which screw means is engaged such that rotation of the screw means causes the inner and outer sleeve members to be moved axially and non-rotatably relative to one another.

14. A pipe fitting according to claim 1, in which the inner and outer sleeve members are slidably interengaged, one of the inner and outer sleeve members including ratchet means and a ratchet element co-operating with the ratchet means such that on axial movement of the inner and outer sleeve members relative to one another the ratchet means and ratchet element maintain the new positions of the inner and outer sleeve members relative to one another.

15. A pipe fitting according to claim 1, further comprising a saddle selectively coupleable to the fitting, wherein in an operative position, the saddle is secured to the wall in which the aperture is formed and receives and locates the fitting for insertion into the aperture.

16. A pipe fitting according to claim 15, in which the fitting is detachable from the saddle.

17. A pipe fitting according to claim 15, wherein, in an operative position, the saddle is secured to an attachment which is connected to the fitting.

18. A pipe fitting according to claim 17, wherein the attachment is a service pipe.

19. A method of applying a pipe fitting to a lined pipe comprising a host pipe and a lining therein, the method including the steps of:

forming a first aperture through the wall of the host pipe of a size to receive an outer sleeve member of the fitting, wherein the fitting includes an inner sleeve member connected to the outer sleeve member so that the inner and outer sleeve members may move axially relative to one another, the inner sleeve member having an end portion insertable through the first aperture;

forming a second aperture through the wall of the lining, wherein a diameter of the second aperture is smaller than a diameter of the first aperture and is sized to receive the end portion of the inner sleeve member;

inserting the end portion into the second aperture;

winding a split, helical washer having an outer diameter greater than the diameter of the second aperture, through the second aperture to overlie an inner surface of the lining around the second apertures;

causing relative axial movement between the inner and outer sleeve members to compress the split washer into annular engagement with the inner surface of said lining and urge the outer sleeve member into the first aperture so that a bearing surface of the outer sleeve member bears on an outer surface of the lining around the second aperture, thereby to grip the lining between the bearing surface and the split washer to seal the connection between the fitting and said lined pipe wherein an outer diameter of the split washer is larger than a diameter of the aperture.

* * * * *